United States Patent
Elizalde et al.

(10) Patent No.: US 7,816,441 B2
(45) Date of Patent: Oct. 19, 2010

(54) DISPERSING ASSISTANT FOR EMULSION AND SUSPENSION POLYMERIZATION

(75) Inventors: Oihana Elizalde, Mannheim (DE); Kathrin Michl, Ludwigshafen (DE); Rajan Venkatesh, Mannheim Neckarstadt-Ost (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/507,972

(22) Filed: Jul. 23, 2009

(65) Prior Publication Data
US 2010/0022708 A1  Jan. 28, 2010

(30) Foreign Application Priority Data
Jul. 25, 2008  (EP)  .................................. 08161191

(51) Int. Cl.
*C08F 2/16* (2006.01)
*C08F 20/06* (2006.01)
*C08L 31/00* (2006.01)

(52) U.S. Cl. ........................ 524/460; 524/553; 524/556; 524/559; 526/280; 526/317.1; 526/318.2; 526/318.3; 526/318.4; 526/318.5

(58) Field of Classification Search ................. 524/460, 524/553, 556, 559; 526/280, 317.1, 318.2, 526/318.3, 318.4, 318.5
See application file for complete search history.

(56) References Cited

U.S. PATENT DOCUMENTS

| 3,314,908 | A  | * | 4/1967 | Kagan et al. | ................. | 524/819 |
| 6,281,298 | B1 | * | 8/2001 | Papsin, Jr. | .................... | 525/419 |
| 6,710,112 | B1 | * | 3/2004 | Sandor et al. | ................ | 524/458 |
| 6,790,272 | B1 | * | 9/2004 | Zhao et al. | ............... | 106/286.8 |

OTHER PUBLICATIONS

U.S. Appl. No. 12/441,143, filed Mar. 13, 2009, Venkatesh.
Ewa Witek, et al., "Novel Synthetic Pathway for Associative Polymers", Polish Journal of Applied Chemistry XLVI, No. 3-4, 2002, 1 front page, pp. 177-185.
S. M. Somoilov, "Propylene Radical Copolymerization with Vinyl Acetate, Methyl Acrylate, Dimethyl Maleate, and Diethyl Fumarate", J. Macromol. Sci. Chem., A19, (1),1983, 1 front page, pp. 107-122.
Shengsheng Liu, et al., "Copper-Mediated Controlled Copolymerization of Methyl Acrylate with 1-Alkenes under Mild Conditions", J. Am. Chem. Soc., 123, Nov. 17, 2001, pp. 12738-12739.
Rajan Venkatesh, et al., "Olefin Copolymerization via Controlled Radical Polymerization: Copolymerization of Acrylate and 1-Octene", Macromolecules,37, May 21, 2004, pp. 4406-4416.
Shengsheng Liu, et al., "Living/Controlled Copolymerization of Acrylates with Nonactivated Alkenes", Journal of Polymer Science: Part A: Polymer Chemistry, vol. 42, 2004, pp. 6175-6192.
U.S. Appl. No. 12/679,409, filed Mar. 22, 2010, Elizalde, et al.

* cited by examiner

*Primary Examiner*—David Wu
*Assistant Examiner*—Marie Reddick
(74) *Attorney, Agent, or Firm*—Oblon, Spivak, McClelland, Maier & Neustadt, L.L.P.

(57) ABSTRACT

The use of an addition polymer A composed in copolymerized form of
  0.1% to 40% by weight of at least one C3 to C30 alkene,
  40% to 99.9% by weight of at least one ethylenically unsaturated C3 to C6 monocarboxylic acid,
  0% to 50% by weight of at least one ethylenically unsaturated C4 to C12 dicarboxylic acid and/or of the ethylenically unsaturated dicarboxylic monoalkyl esters or dicarboxylic anhydrides obtainable from said acid, and
  0% to 30% by weight of at least one other ethylenically unsaturated compound which is copolymerizable with the aforementioned monomers,
as a dispersing assistant in free-radically initiated aqueous emulsion or suspension polymerization.

18 Claims, No Drawings

DISPERSING ASSISTANT FOR EMULSION AND SUSPENSION POLYMERIZATION

The subject matter of the present invention relates to the use of an addition polymer A composed in copolymerized form of 0.1% to 40% by weight of at least one C3 to C30 alkene (monomer A1), 40% to 99.9% by weight of at least one ethylenically unsaturated C3 to C6 monocarboxylic acid (monomer A2), 0% to 50% by weight of at least one ethylenically unsaturated C4 to C12 dicarboxylic acid and/or of the ethylenically unsaturated dicarboxylic monoalkyl esters or dicarboxylic anhydrides obtainable from said acid (monomer A3), and 0% to 30% by weight of at least one other ethylenically unsaturated compound which is copolymerizable with the monomers A1 to A3 (monomer A4), the amounts of monomers A1 to A4 adding up to 100% by weight, as a dispersing assistant in free-radically initiated aqueous emulsion polymerization or suspension polymerization.

The preparation and use of polymers composed in polymerized form of alkenes and other ethylenically unsaturated monomers are well known to the skilled worker. The copolymerization takes place essentially in the form of a solution polymerization (see, for example, A. Sen et al., Journal American Chemical Society, 2001, 123, pages 12 738 to 12 739; B. Klumperman et al., Macromolecules, 2004, 37, pages 4406 to 4416; A. Sen et al., Journal of Polymer Science, Part A: Polymer Chemistry, 2004, 42(24), pages 6175 to 6192; WO 03/042254, WO 03/091297 or EP-A 1384729) or in the form of an aqueous emulsion polymerization, this taking place more particularly on the basis of the lowest alkene, ethene (see, for example, U.S. Pat. No. 4,921,898, U.S. Pat. No. 5,070,134, U.S. Pat. No. 5,110,856, U.S. Pat. No. 5,629,370, EP-A 295727, EP-A 757065, EP-A 1114833 or DE-A 19620817).

DE-A 1720277 discloses a process for preparing film-forming aqueous addition-polymer dispersions using vinyl esters and 1-octene. The weight ratio of vinyl ester to 1-octene can be from 99:1 to 70:30. Optionally the vinyl esters can be used to a minor extent in a mixture with other copolymerizable ethylenically unsaturated compounds for the emulsion polymerization.

S. M. Samoilov in J. Macromol. Sci. Chem., 1983, A19(1), pages 107 to 122 describes the free-radically initiated aqueous emulsion polymerization of propene with different ethylenically unsaturated compounds. The outcome observed there was that the copolymerization of propene with ethylenically unsaturated compounds having strongly electron-withdrawing groups, such as chlorotrifluoroethylene, trifluoroacrylonitrile, maleic anhydride or methyl trifluoroacrylate, gave polymers having a markedly higher propene fraction, or copolymers having higher molecular weights, than when using the ethylenically unsaturated compounds typically associated with free-radically initiated aqueous emulsion polymerization, viz. vinyl acetate, vinyl chloride, methyl acrylate and/or butyl acrylate. The reasons given for this behavior include more particularly the hydrogen radical transfer reactions that are typical of the higher alkenes.

The preparation of aqueous addition-polymer dispersions based on different, extremely water-insoluble monomers by free-radically initiated emulsion polymerization using host compounds is disclosed in U.S. Pat. No. 5,521,266 and EP-A 780401.

DE-A 102005035692 discloses the preparation of aqueous addition-polymer dispersions based on alkenes having 5 to 12 C atoms. The alkenes having 5 to 12 C atoms are metered into the polymerization mixture under polymerization conditions.

EP-A 891430 discloses aqueous polymer systems for imparting water repellency to leather, said systems being obtained by free-radical polymerization of 20% to 90% by weight of monoethylenically unsaturated C4 to C6 dicarboxylic acids and/or their anhydrides with 5% to 50% by weight of a C2 to C6 olefin and 5% to 50% by weight of a hydrophobic ethylenically unsaturated monomer.

EP-A 670909 discloses aqueous polymer dispersions which are used as a component for fatliquoring or softening leather and which are obtained by free-radical polymerization of maleic anhydride, C12 to C30 α-olefins, and esters of acrylic acid, methacrylic acid and/or maleic acid with C12 to C30 alcohols.

Coating compositions based on a crosslinker, such as an endgroup-capped polyisocyanate or an amino resin, for example, and on an emulsion polymer based on α-olefins and ethylenically unsaturated carboxylic anhydrides, are disclosed in EP-A 450452.

E. Witek, A. Kochanowski, E. Bortel, Polish Journal of Applied Chemistry XLVI, no. 3-4, pages 177-185 (2002), describes the use of copolymers based on long-chain α-olefins and hydrophilic monomers, such as acrylic acid and/or maleic anhydride, for example, for removing crude-oil contamination in water.

A priority-founding patent application filed by the applicant at the European Patent Office and bearing the file reference 07118135.8, discloses the preparation and the use of polymers A as a component in binders for fibrous and/or granular substrates.

EP-A 450452 discloses the preparation of aqueous copolymer dispersions by free-radically initiated aqueous emulsion polymerization of ethylenically unsaturated monomers in the presence of dispersants obtained by free-radical addition-polymerization of an olefin having at least 8 carbon atoms and of an ethylenically unsaturated monomer containing carboxylic anhydride groups, with subsequent base neutralization. The neutralization of the dispersing assistants in that case is mandatory in order to convert them from the water-insoluble anhydride form into the water-soluble carboxylate form.

It was an object of the present invention to provide new dispersing assistants for free-radically initiated aqueous emulsion polymerization or suspension polymerization that are water-soluble even without neutralization.

Surprisingly this object has been achieved by means of the use defined at the outset.

The implementation of free-radically initiated emulsion polymerizations [cf. on this point, for example, Emulsion polymerisation in Encyclopedia of Polymer Science and Engineering, Vol. 8, pages 659 ff. (1987); D. C. Blackley, in High Polymer Latices, Vol. 1, pages 35 ff. (1966); H. Warson, The Applications of Synthetic Resin Emulsions, Chapter 5, pages 246 ff. (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)] or Suspensionspolymerisationen [cf., e.g., Encyclopedia of Polymer Science and Engineering, Vol. 16, pages 443ff. (1989); High Polymers, Vol. X, Polymer Processes, Interscience Publishers, Inc., pages 69ff. (1956); High Polymers, Vol. XXIX, Polymerization Processes, John Wiley & Sons, Inc., pages 106ff. (1977); Ullmanns Encyclopädie der technischen Chemie, 4th edn., Vol.

19, pages 125ff.] of ethylenically unsaturated monomers in an aqueous medium has been much described in the past and is therefore sufficiently well known to the skilled worker. The free-radically initiated aqueous emulsion or suspension polymerization reactions are typically accomplished by dispersing the ethylenically unsaturated monomers, using dispersing assistants, in the form of monomer droplets in the aqueous medium, and polymerizing them by means of a free-radical initiator. The free-radically initiated aqueous emulsion polymerization differs from the free-radically initiated aqueous suspension polymerization essentially in the use of a so-called water-soluble free-radical initiator (in the case of emulsion polymerization) or of a so-called oil-soluble free-radical initiator (in the case of suspension polymerization).

The dispersing assistants used in free-radically initiated aqueous emulsion or suspension polymerization are intended to maintain not only the monomer droplets but also the polymer particles formed in dispersion in the aqueous medium and so to ensure the stability of the aqueous polymer dispersion produced. Dispersing assistants contemplated include in principle not only emulsifiers (long-chain, hydrophobic organic radical, hydrophilic head group; average molecular weight <1000 g/mol; see for example, Houben-Weyl, Methoden der organischen Chemie, Volume XIV/1, Makromolekulare Stoffe, Georg-Thieme-Verlag, Stuttgart, 1961, pages 192 to 208) but also protective colloids (hydrophilic and hydrophobic structural units distributed over the polymeric molecule; average molecular weight >1000 g/mol; see for example Houben-Weyl, Methoden der organischen Chemie, Volume XIV/1, Makromolekulare Stoffe, Georg-Thieme-Verlag, Stuttgart, 1961, pages 411 to 420) which have both a micelle-forming and electrostatic stabilizing action.

The aforementioned polymers A can be used advantageously in accordance with the invention as dispersing assistants.

In accordance with the invention the addition polymer A is composed in copolymerized form of
0.1% to 40% by weight of at least one monomer A1,
40% to 99.9% by weight of at least one monomer A2,
0% to 50% by weight of at least one monomer A3, and
0% to 30% by weight of at least one monomer A4.

With particular advantage the addition polymer A is composed in copolymerized form of
1% to 25% by weight of at least one monomer A1,
50% to 89% by weight of at least one monomer A2, and
10% to 40% by weight of at least one monomer A3,
and with particular advantage of
5% to 20% by weight of at least one monomer A1,
55% to 75% by weight of at least one monomer A2, and
20% to 35% by weight of at least one monomer A3.

Monomers A 1 contemplated are C3 to C30 alkenes, preferably C6 to C18 alkenes, and more particularly C8 to C12 alkenes which can be copolymerized free-radically and which apart from carbon and hydrogen have no further elements. They include, for example, the linear alkenes propene, n-but-1-ene, n-but-2-ene, 2-methylpropene, 2-methylbut-1-ene, 3-methylbut-1-ene, 3,3-dimethyl-2-isopropylbut-1-ene, 2-methylbut-2-ene, 3-methylbut-2-ene, pent-1-ene, 2-methylpent-1-ene, 3-methylpent-1-ene, 4-methylpent-1-ene, pent-2-ene, 2-methylpent-2-ene, 3-methylpent-2-ene, 4-methylpent-2-ene, 2-ethylpent-1-ene, 3-ethylpent-1-ene, 4-ethylpent-1-ene, 2-ethylpent-2-ene, 3-ethylpent-2-ene, 4-ethylpent-2-ene, 2,4,4-trimethylpent-1-ene, 2,4,4-trimethylpent-2-ene, 3-ethyl-2-methylpent-1-ene, 3,4,4-trimethylpent-2-ene, 2-methyl-3-ethylpent-2-ene, hex-1-ene, 2-methylhex-1-ene, 3-methylhex-1-ene, 4-methylhex-1-ene, 5-methylhex-1-ene, hex-2-ene, 2-methylhex-2-ene, 3-methylhex-2-ene, 4-methylhex-2-ene, 5-methylhex-2-ene, hex-3-ene, 2-methylhex-3-ene, 3-methylhex-3-ene, 4-methylhex-3-ene, 5-methylhex-3-ene, 2,2-dimethylhex-3-ene, 2,3-dimethylhex-2-ene, 2,5-dimethylhex-3-ene, 2,5-dimethylhex-2-ene, 3,4-dimethylhex-1-ene, 3,4-dimethylhex-3-ene, 5,5-dimethylhex-2-ene, 2,4-dimethylhex-1-ene, hept-1-ene, 2-methylhept-1-ene, 3-methylhept-1-ene, 4-methylhept-1-ene, 5-methylhept-1-ene, 6-methylhept-1-ene, hept-2-ene, 2-methylhept-2-ene, 3-methylhept-2-ene, 4-methylhept-2-ene, 5-methylhept-2-ene, 6-methylhept-2-ene, hept-3-ene, 2-methylhept-3-ene, 3-methylhept-3-ene, 4-methylhept-3-ene, 5-methylhept-3-ene, 6-methylhept-3-ene, 6,6-dimethylhept-1-ene, 3,3-dimethylhept-1-ene, 3,6-dimethylhept-1-ene, 2,6-dimethylhept-2-ene, 2,3-dimethylhept-2-ene, 3,5-dimethylhept-2-ene, 4,5-dimethylhept-2-ene, 4,6-dimethylhept-2-ene, 4-ethylhept-3-ene, 2,6-dimethylhept-3-ene, 4,6-dimethylhept-3-ene, 2,5-dimethylhept-4-ene, oct-1-ene, 2-methyloct-1-ene, 3-methyloct-1-ene, 4-methyloct-1-ene, 5-methyloct-1-ene, 6-methyloct-1-ene, 7-methyloct-1-ene, oct-2-ene, 2-methyloct-2-ene, 3-methyloct-2-ene, 4-methyloct-2-ene, 5-methyloct-2-ene, 6-methyloct-2-ene, 7-methyloct-2-ene, oct-3-ene, 2-methyloct-3-ene, 3-methyloct-3-ene, 4-methyloct-3-ene, 5-methyloct-3-ene, 6-methyloct-3-ene, 7-methyloct-3-ene, oct-4-ene, 2-methyloct-4-ene, 3-methyloct-4-ene, 4-methyloct-4-ene, 5-methyloct-4-ene, 6-methyloct-4-ene, 7-methyloct-4-ene, 7,7-dimethyloct-1-ene, 3,3-dimethyloct-1-ene, 4,7-dimethyloct-1-ene, 2,7-dimethyloct-2-ene, 2,3-dimethyloct-2-ene, 3,6-dimethyloct-2-ene, 4,5-dimethyloct-2-ene, 4,6-dimethyloct-2-ene, 4,7-dimethyloct-2-ene, 4-ethyloct-3-ene, 2,7-dimethyloct-3-ene, 4,7-dimethyloct-3-ene, 2,5-dimethyloct-4-ene, non-1-ene, 2-methylnon-1-ene, 3-methylnon-1-ene, 4-methylnon-1-ene, 5-methylnon-1-ene, 6-methylnon-1-ene, 7-methylnon-1-ene, 8-methylnon-1-ene, non-2-ene, 2-methylnon-2-ene, 3-methylnon-2-ene, 4-methylnon-2-ene, 5-methylnon-2-ene, 6-methylnon-2-ene, 7-methylnon-2-ene, 8-methylnon-2-ene, non-3-ene, 2-methylnon-3-ene, 3-methylnon-3-ene, 4-methylnon-3-ene, 5-methylnon-3-ene, 6-methylnon-3-ene, 7-methylnon-3-ene, 8-methylnon-3-ene, non-4-ene, 2-methylnon-4-ene, 3-methylnon-4-ene, 4-methylnon-4-ene, 5-methylnon-4-ene, 6-methylnon-4-ene, 7-methylnon-4-ene, 8-methylnon-4-ene, 4,8-dimethylnon-1-ene, 4,8-dimethylnon-4-ene, 2,8-dimethylnon-4-ene, dec-1-ene, 2-methyldec-1-ene, 3-methyldec-1-ene, 4-methyldec-1-ene, 5-methyldec-1-ene, 6-methyldec-1-ene, 7-methyldec-1-ene, 8-methyldec-1-ene, 9-methyldec-1-ene, dec-2-ene, 2-methyldec-2-ene, 3-methyldec-2-ene, 4-methyldec-2-ene, 5-methyldec-2-ene, 6-methyldec-2-ene, 7-methyldec-2-ene, 8-methyldec-2-ene, 9-methyldec-2-ene, dec-3-ene, 2-methyldec-3-ene, 3-methyldec-3-ene, 4-methyldec-3-ene, 5-methyldec-3-ene, 6-methyldec-3-ene, 7-methyldec-3-ene, 8-methyldec-3-ene, 9-methyldec-3-ene, dec-4-ene, 2-methyldec-4-ene, 3-methyldec-4-ene, 4-methyldec-4-ene, 5-methyldec-4-ene, 6-methyldec-4-ene, 7-methyldec-4-ene, 8-methyldec-4-ene, 9-methyldec-4-ene, dec-5-ene, 2-methyldec-5-ene, 3-methyldec-5-ene, 4-methyldec-5-ene, 5-methyldec-5-ene, 6-methyldec-5-ene, 7-methyldec-5-ene, 8-methyldec-5-ene, 9-methyldec-5-ene, 2,4-dimethyldec-1-ene, 2,4-dimethyldec-2-ene, 4,8-dimethyldec-1-ene, undec-1-ene, 2-methylundec-1-ene, 3-methylundec-1-ene, 4-methylundec-1-ene, 5-methylundec-1-ene, 6-methylundec-1-ene, 7-methylundec-1-ene, 8-methylundec-1-ene, 9-methylundec-1-ene, 10-methylundec-1-ene, undec-2-ene, 2-methylundec-2-ene, 3-methylundec-2-ene, 4-methylundec-2-ene, 5-methylundec-2-ene, 6-methylundec-2-ene, 7-methylundec-2-ene, 8-methylundec-2-ene, 9-methylundec-2-ene, 10-methylundec-2-ene, undec-3-ene, 2-methylundec-3-ene, 3-methylundec-3-ene, 4-methylundec-3-ene, 5-methylundec-3-ene, 6-methylundec-3-ene, 7-methylundec-3-ene, 8-methylundec-3-ene, 9-methylundec-3-ene, 10-methylundec-3-ene, undec-4-ene, 2-methylundec-4-ene, 3-methylundec-4-ene, 4-methylundec-4-ene, 5-methylundec-4-ene, 6-methylundec-4-ene, 7-methylundec-4-ene, 8-methylundec-4-ene, 9-methylundec-4-ene, 10-methylundec-4-ene, undec-5-ene, 2-methylundec-5-ene, 3-methylundec-5-ene, 4-methylundec-5-ene, 5-methylundec-5-ene, 6-methylundec-5-ene, 7-methylundec-5-ene, 8-methylundec-5-ene, 9-methylundec-5-ene, 10-methylundec-5-ene, dodec-1-ene, dodec-2-ene, dodec-3-ene, dodec-4-ene, dodec-5-ene, dodec-6-ene, 4,8-dimethyldec-1-ene, 4-ethyldec-1-ene, 6-ethyldec-1-ene, 8-ethyldec-1-ene, 2,5,8-trimethylnon-1-ene, tridec-1-ene, tridec-2-ene, tridec-3-ene, tridec-4-ene, tridec-5-ene, tridec-6-ene, 2-methyldodec-1-ene, 11-methyldodec-1-ene, 2,5-dimethylundec-2-ene, 6,10-dimethylundec-1-ene, tetradec-1-ene, tetradec-2-ene, tetradec-3-ene, tetradec-4-ene, tetradec-5-ene, tetradec-6-ene, tetradec-7-ene, 2-methyltridec-1-ene, 2-ethyldodec-1-ene, 2,6,10-trimethylundec-1-ene, 2,6-dimethyldodec-2-ene, 11-methyltridec-1-ene, 9-methyltridec-1-ene, 7-methyltridec-1-ene, 8-ethyldodec-1-ene, 6-ethyldodec-1-ene, 4-ethyldodec-1-ene, 6-butyldec-1-ene, pentadec-1-ene, pentadec-2-ene, pentadec-3-ene, pentadec-4-ene, pentadec-5-ene, pentadec-6-ene, pentadec-7-ene, 2-methyltetradec-1-ene, 3,7,11-trimethyldodec-1-ene, 2,6,10-trimethyldodec-1-ene, hexadec-1-ene, hexadec-2-ene, hexadec-3-ene, hexadec-4-ene, hexadec-5-ene, hexadec-6-ene, hexadec-7-ene, hexadec-8-ene, 2-methylpentadec-1-ene, 3,7,11-trimethyltridec-1-ene, 4,8,12-trimethyltridec-1-ene, 11-methylpentadec-1-ene, 13-methylpentadec-1-ene, 7-methylpentadec-1-ene, 9-methylpentadec-1-ene, 12-ethyltetradec-1-ene, 8-ethyltetradec-1-ene, 4-ethyltetradec-1-ene, 8-butyldodec-1-ene, 6-butyldodec-1-ene, heptadec-1-ene, heptadec-2-ene, heptadec-3-ene, heptadec-4-ene, heptadec-5-ene, heptadec-6-ene, heptadec-7-ene, heptadec-8-ene, 2-methylhexadec-1,4,8-ene, 12-trimethyltetradec-1-ene, octadec-1-ene, octadec-2-ene, octadec-3-ene, octadec-4-ene, octadec-5-ene, octadec-6-ene, octadec-7-ene, octadec-8-ene, octadec-9-ene, 2-methylheptadec-1-ene, 13-methylheptadec-1-ene, 10-butyltetradec-1-ene, 6-butyltetradec-1-ene, 8-butyltetradec-1-ene, 10-ethylhexadec-1-ene, nonadec-1-ene, nonadec-2-ene, 1-methyloctadec-1-ene, 7,11,15-trimethylhexadec-1-ene, eicos-1-ene, eicos-2-ene, 2,6,10,14-tetramethylhexadec-2-ene, 3,7,11,15-tetramethylhexadec-2-ene, 2,7,11,15-tetramethylhedec-1-ene, docos-1-ene, docos-2-ene, docos-7-ene, 4,9,13,17-tetramethyloctadec-1-ene, tetracos-1-ene, tetracos-2-ene, tetracos-9-ene, hexacos-1-ene, hexacos-2-ene, hexacos-9-ene, triacont-1-ene, dotriacont-1-ene or tritriacont-1-ene, and also the cyclic alkenes cyclopentene, 2-methylcyclopent-1-ene, 3-methylcyclopent-1-ene, 4-methylcyclopent-1-ene, 3-butylcyclopent-1-ene, vinylcyclopentane, cyclohexene, 2-methylcyclohex-1-ene, 3-methylcyclohex-1-ene, 4-methylcyclohex-1-ene, 1,4-dimethylcyclohex-1-ene, 3,3,5-trimethylcyclohex-1-ene, 4-cyclopentylcyclohex-1-ene, vinylcyclohexane, cycloheptene, 1,2-dimethylcyclohept-1-ene, cyclooctene, 2-methylcyclooct-1-ene, 3-methylcyclooct-1-ene, 4-methylcyclooct-1-ene, 5-methylcyclooct-1-ene, cyclononene, cyclodecene, cycloundecene, cyclododecene, bicyclo[2.2.1]hept-2-ene, 5-ethylbicyclo[2.2.1]hept-2-ene, 2-methylbicyclo[2.2.2]oct-2-ene, bicyclo[3.3.1]non-2-ene or bicyclo[3.2.2]non-6-ene. It will be appreciated that mixtures of aforementioned monomers can also be used in preparing the polymer A.

In order to prepare the polymer A preference is given to using the 1-alkenes, examples being propene, 2-methylpropene, but-1-ene, pent-1-ene, hex-1-ene, hept-1-ene, oct-1-ene, non-1-ene, dec-1-ene, undec-1-ene, dodec-1-ene, 2,4,4-trimethylpent-1-ene, 2,4-dimethylhex-1-ene, 6,6-dimethylhept-1-ene, 2-methyloct-1-ene, tridec-1-ene, tetradec-1-ene, hexadec-1-ene, heptadec-1-ene, octadec-1-ene, nonadec-1-ene, eicos-1-ene, docos-1-ene, tetracos-1-ene, 2,6-dimethyldodec-1-ene, 6-butyldec-1-ene, 4,8,12-trimethyldec-1-ene or 2-methylheptadec-1-ene. Advantageously, at least one monomer A1 used is an alkene having 6 to 18 carbon atoms, preferably a 1-alkene having 8 to 12 carbon atoms. Preference is given more particularly to using oct-1-ene, non-1-ene, dec-1-ene, undec-1-ene and/or dodec-1-ene, with oct-1-ene and dodec-1-ene being particularly preferred.

The polymer A composed in copolymerized form is 0.1% to 40%, preferably 1% to 25%, and with more particular preference 5% to 20% by weight of monomers A1.

Monomers A2 contemplated are all ethylenically unsaturated monocarboxylic acids, more particularly α,β-monoethylenically unsaturated monocarboxylic acids, of 3 to 6 carbon atoms, and also their water-soluble salts, more particularly their alkali metal salts or ammonium salts, such as, for example, acrylic acid, methacrylic acid, ethylacrylic acid, allylacetic acid, crotonic acid and/or vinylacetic acid, and also the ammonium, sodium or potassium salts of the aforementioned acids. Particular preference is given to acrylic acid and methacrylic acid, with acrylic acid being more particularly preferred.

The amount of monomers A2 in the polymer A is 40% to 99.9%, preferably 50% to 89%, and with more particular preference 55% to 75% by weight in copolymerized form.

Monomers A3 contemplated are all ethylenically unsaturated dicarboxylic acids, more particularly α,β-monoethylenically unsaturated dicarboxylic acids, of 4 to 12 carbon atoms, and also their water-soluble salts, more particularly their alkali metal salts or ammonium salts, and/or the ethylenically unsaturated dicarboxylic acid monoalkyl esters that are obtainable from the ethylenically unsaturated dicarboxylic acids of 4 to 12 carbon atoms, more particularly their C1 to C6 monoalkyl esters, examples being their monomethyl, monoethyl, monopropyl, monoisopropyl, monobutyl, monopentyl or monohexyl esters and also the correspondingly obtainable dicarboxylic anhydrides, such as, for example, maleic acid, fumaric acid, itaconic acid, methylmaleic acid, 1,2,3,6-tetrahydrophthalic acid, and the ammonium, sodium or potassium salts of the aforementioned acids, monomethyl, monoethyl, and monopropyl maleate, fumarate, itaconate, methylmaleate, and 1,2,3,6-tetrahydrophthalate, maleic anhydride, itaconic anhydride, methylmaleic anhydride or 1,2,3,6-tetrahydrophthalic anhydride. Particular preference is given to maleic anhydride, methylmaleic anhydride, maleic acid, methylmaleic acid, monomethyl maleate, itaconic acid, itaconic anhydride, 1,2,3,6-tetrahydrophthalic acid and/or 1,2,3,6-tetrahydrophthalic anhydride, with maleic anhydride being more particularly preferred.

The amount of monomers A3 in polymer A is 0% to 50%, preferably 10% to 40%, and with more particular preference 20% to 35% by weight, in copolymerized form.

Monomers A4 contemplated are all those ethylenically unsaturated compounds which can easily be copolymerized free-radically with the monomers A1 to A3, such as, for example, vinylaromatic monomers, such as styrene, α-methylstyrene, o-chlorostyrene or vinyltoluenes, vinyl halides, such as vinyl chloride or vinylidene chloride, esters of vinyl alcohol and monocarboxylic acids having 1 to 18 C atoms, such as vinyl acetate, vinyl propionate, vinyl n-butyrate, vinyl laurate, and vinyl stearate, esters of α,β-monoethylenically unsaturated monocarboxylic and dicarboxylic acids preferably of 3 to 6 C atoms, such as, more particularly, acrylic acid, methacrylic acid, maleic acid, fumaric acid, and itaconic acid, with alkanols having generally 1 to 12, preferably 1 to 8, and more particularly 1 to 4 C atoms, such as, in particular, methyl, ethyl, n-butyl, isobutyl, pentyl, hexyl, heptyl, octyl, nonyl, decyl and 2-ethylhexyl acrylate and methacrylate, dimethyl or di-n-butyl fumarate and maleate, nitriles of α,β-monoethylenically unsaturated carboxylic acids, such as acrylonitrile, methacrylonitrile, fumaronitrile, maleonitrile, and also $C_{4-8}$ conjugated dienes, such as 1,3-butadiene (butadiene) and isoprene. The stated monomers generally form the principal monomers, which, based on the total amount of monomers A4, account for a fraction of $\geq 50\%$, preferably $\geq 80\%$, and with more particular preference $\geq 90\%$ by weight, or even form the total amount of the monomers A4. As a general rule these monomers are of only moderate to low solubility in water under standard conditions [20° C., 1 atm (absolute)].

Monomers A4 which have a heightened water-solubility under the above-stated conditions are those which comprise either at least one sulfonic acid group and/or its corresponding anion, or at least one amino, amido, ureido or N-heterocyclic group and/or the ammonium derivatives thereof that are alkylated or protonated on the nitrogen. Mention may be made exemplarily of acrylamide and methacrylamide, and also vinylsulfonic acid, 2-acrylamido-2-methylpropanesulfonic acid, styrenesulfonic acid, and their water-soluble salts, and also N-vinylpyrrolidone, 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylaminopropyl)methacrylamide, and 2-(1-imidazoline-2-onyl)ethyl methacrylate. Normally the aforementioned water-soluble monomers A4 are used only as modifying monomers, in amounts of $\leq 10\%$, preferably $\leq 5\%$, and with more particular preference $\leq 3\%$ by weight, based in each case on the total amount of monomers A4.

Monomers A4 which typically enhance the internal strength of the films formed from a polymer matrix normally contain at least one epoxy group, at least one carbonyl group or at least two nonconjugated ethylenically unsaturated double bonds. Examples of such monomers are monomers containing two vinyl radicals, monomers containing two vinylidene radicals, and monomers containing two alkenyl radicals. Particularly advantageous in this context are the diesters of dihydric alcohols with α,β-monoethylenically unsaturated monocarboxylic acids, among which acrylic acid and methacrylic acid are preferred. Examples of such monomers containing two nonconjugated ethylenically unsaturated double bonds are alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylates, and ethylene glycol dimethacrylate, 1,2-propylene glycol dimethacrylate, 1,3-propylene glycol dimethacrylate, 1,3-butylene glycol dimethacrylate, and 1,4-butylene glycol dimethacrylate, and also divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate or triallyl isocyanurate. Frequently the aforementioned crosslinking monomers A4 are used in amounts of $\leq 10\%$ by weight, but preferably in amounts of $\leq 3\%$ by weight, based in each case on the total amount of monomers A4. With more particular preference, however, no such crosslinking monomers A4 at all are used in preparing the polymer A.

The amount of monomers A4 in the polymer A is 0% to 30% by weight and preferably 0% to 15% by weight, in copolymerized form. With particular advantage the polymer A comprises no monomer A4 in copolymerized form.

In preparing the polymer A used in accordance with the invention it is optionally possible to include in each case a portion or the total amount of the monomers A1 to A4 in the initial charge to the polymerization vessel. It is also possible, however, in each case to meter in optionally the total amount or the respective remainder, of the monomers A1 to A4 during the polymerization reaction. The total amounts or the optionally remainders, of monomers A1 to A4 may in that case be metered discontinuously, in one or more portions, or continuously, with constant or changing volume flows, to the polymerization vessel. Frequently at least a portion of the monomers A1 and/or A3, and, advantageously, monomer A3 exclusively, in the polymerization medium, is included in the initial charge before the polymerization reaction is initiated.

The preparation of the polymers A is familiar in principle to the skilled worker and is accomplished more particularly by free-radically initiated solution polymerization in—for example—water or an organic solvent (see, for example, A. Echte, Handbuch der Technischen Polymerchemie, chapter 6, VCH, Weinheim, 1993 or B. Vollmert, Grundriss der Makromolekularen Chemie, volume 1, E. Vollmert Verlag, Karlsruhe, 1998).

The free-radically initiated solution polymerization of the monomers A1 to A4 takes place preferably in a protic or an aprotic organic solvent, with aprotic solvents being more particularly preferred. Suitable aprotic organic solvents include all organic solvents which under polymerization conditions comprise no ionizable proton in the molecule or have a pKs which is greater than that of water. Examples of such solvents are aromatic hydrocarbons, such as toluene, o-, m-, and p-xylene, and isomer mixtures, and also ethylbenzene, linear or cyclic aliphatic hydrocarbons, such as pentane, hexane, heptane, octane, nonane, dodecane, cyclohexane, cyclooctane, methylcyclohexane, and also mixtures of the stated hydrocarbons, and petroleum fractions which comprise no polymerizable monomers, or aliphatic or aromatic halogenated hydrocarbons, such as chloroform, carbon tetrachloride, hexachloroethane, dichloroethane, tetrachloroethane, chlorobenzene, and also liquid C1 and C2 hydrofluorochlorocarbons, aliphatic C2 to C5 nitriles, such as acetonitrile, propionitrile, butyronitrile or valeronitrile, linear or cyclic aliphatic C3 to C7 ketones, such as acetone, methyl ethyl ketone, methyl isobutyl ketone, 2- and 3-hexanone, 2-, 3-, and 4-heptanone, cyclopentanone, cyclohexanone, linear or cyclic aliphatic ethers, such as diisopropyl ether, 1,3- or 1,4-dioxane, tetrahydrofuran or ethylene glycol dimethyl ether, carbonates, such as diethyl carbonate, and also esters of aliphatic C1 to C5 carboxylic acids or aromatic carboxylic acids with aliphatic C1 to C5 alcohols, such as ethyl formate, n-propyl formate, isopropyl formate, n-butyl formate, isobutyl formate, tert-butyl formate, amyl formate, methyl acetate, ethyl acetate, n-propyl acetate, isopropyl acetate, n-butyl acetate, isobutyl acetate, tert-butyl acetate, amyl acetate, methyl propionate, ethyl propionate, n-propyl propionate, isopropyl propionate, n-butyl propionate, isobutyl propionate, tert-butyl propionate, amyl propionate, methyl butyrate, ethyl butyrate, n-propyl butyrate, isopropyl butyrate, n-butyl butyrate, isobutyl butyrate, tert-butyl butyrate, amyl butyrate, methyl valerate, ethyl valerate, n-propyl valerate, isopropyl valerate, n-butyl valerate, isobutyl valerate, tert-butyl valerate, amyl valerate, methyl benzoate or ethyl benzoate, and also lactones, such as butyrolactone, valerolactone or caprolactone.

Preference, however, is given to selecting those aprotic organic solvents in which the particular free-radical initiators used dissolve well. More particularly, use is made of those aprotic organic solvents in which not only the free-radical initiators but also the polymers A dissolve well. More particular preference is given to selecting those aprotic organic solvents which additionally can be separated in a simple way from the resulting polymer A solution, such as, for example, by distillation, inert-gas stripping and/or steam distillation. Preferred examples of such are esters of aliphatic C1 to C5 carboxylic acids or aromatic carboxylic acids with aliphatic C1 to C5 alcohols, such as ethyl formate, n-propyl formate, isopropyl formate, n-butyl formate, isobutyl formate, tert-butyl formate, amyl formate, methyl acetate, ethyl acetate, n-propyl acetate, isopropyl acetate, n-butyl acetate, isobutyl acetate, tert-butyl acetate, amyl acetate, methyl propionate, ethyl propionate, n-propyl propionate, isopropyl propionate, n-butyl propionate, isobutyl propionate, tert-butyl propionate, amyl propionate, methyl butyrate, ethyl butyrate, n-propyl butyrate, isopropyl butyrate, linear or cyclic aliphatic ethers, such as diisopropyl ether, 1,3- or 1,4-dioxane, tetrahydrofuran or ethylene glycol dimethyl ether, methyl glycol acetate, diethyl carbonate, linear or cyclic aliphatic C3 to C7 ketones, such as acetone, methyl ethyl ketone, methyl isobutyl ketone, 2- or 3-hexanone, 2-, 3- or 4-heptanone, cyclopentanone, or cyclohexanone. Particularly preferred solvents are the abovementioned esters of aliphatic C1 to C5 carboxylic acids or aromatic carboxylic acids with aliphatic C1 to C5 alcohols, but more particularly ethyl acetate and ethyl butyrate, and also C4 to C6 ketones, more particularly methyl ethyl ketone. It is advantageous if the solvent has a boiling point under atmospheric pressure (1 atm$\hat{=}$1.013 ba absolute) $\leq$140° C., frequently $\leq$125° C., and more particularly $\leq$100° C., or forms a low-boiling azeotropic water/solvent mixture with water. It will be appreciated that a mixture of two or more solvents can also be used.

The amount of solvent in the preparation of the polymer A is 40 to 9900 parts, preferably 70 to 400 parts, and with more particular preference 80 to 200 parts by weight, based in each case on 100 parts by weight of total monomers.

In preparing the polymer A used in accordance with the invention it is optionally possible to include a portion or the entirety of solvent in the initial charge to the polymerization vessel. It is, however, also possible to meter in the entirety or any remainder of solvent during the polymerization reaction. In that case the entirety or the optional remainder of solvent can be metered into the polymerization vessel discontinuously, in one or more portions, or continuously, with constant or changing volume flows. Advantageously a portion of the solvent as polymerization medium is included in the initial charge to the polymerization vessel before the polymerization reaction is initiated, and the remainder is metered in together with the monomers A1 to A4 and the free-radical initiator during the polymerization reaction.

The free-radical polymerization of the monomers A1 to A4 is initiated and maintained by means of what are known as free-radical initiators. Free-radical initiators (initiators which form free radicals) that are suitable are preferably all those radical-forming initiators which have a half-life at polymerization temperature of $\leq$4 hours, more particularly $\leq$1 hour, and advantageously $\leq$30 minutes.

Where the polymerization of the monomers A1 to A4 is carried out in an aqueous medium, use is made of what are known as water-soluble free-radical initiators, which the skilled worker typically uses in the case of free-radically initiated aqueous emulsion polymerization. If, on the other hand, the polymerization of the monomers is carried out in an organic solvent, then what are known as oil-soluble free-radical initiators are used, which the skilled worker typically uses in the case of free-radically initiated solution polymerization.

Examples that may be mentioned of oil-soluble free-radical initiators include dialkyl and diaryl peroxides, such as di-tert-amyl peroxide, dicumyl peroxide, bis(tert-butylperoxyisopropyl)benzene, 2,5-bis(tert-butylperoxy)-2,5-dimethylhexane, tert-butylcumene peroxide, 2,5-bis(tert-butylperoxy)-2,5-dimethyl-3-hexene, 1,1-bis(tert-butylperoxy)-3,3,5-trimethylcyclohexane, 1,1-bis(tert-butylperoxy)cyclohexane, 2,2-bis(tert-butylperoxy)butane or di-tert-butyl peroxide, aliphatic and aromatic peroxyesters, such as cumyl peroxyneodecanoate, 2,4,4-trimethylpentyl 2-peroxyneodecanoate, tert-amyl peroxyneodecanoate, tert-butyl peroxyneodecanoate, tert-amyl peroxypivalate, tert-butyl peroxypivalate, tert-amyl peroxy-2-ethylhexanoate, tert-butyl peroxy-2-ethylhexanoate, tert-butyl peroxydiethylacetate, 1,4-bis(tert-butylperoxy)cyclohexane, tert-butyl peroxyisobutanoate, tert-butyl peroxy-3,5,5-trimethylhexanoate, tert-butyl peroxyacetate, tert-amyl peroxybenzoate or tert-butyl peroxybenzoate, dialkanoyl and dibenzoyl peroxides, such as diisobutanoyl peroxide, bis(3,5,5-trimethylhexanoyl) peroxide, dilauroyl peroxide, didecanoyl peroxide, 2,5-bis(2-ethylhexanoylperoxy)-2,5-dimethylhexane or dibenzoyl peroxide, and also peroxycarbonates, such as bis(4-tert-butylcyclohexyl)peroxydicarbonate, bis(2-ethylhexyl) peroxydicarbonate, di-tert-butyl peroxydicarbonate, diacetyl peroxydicarbonate, dimyristyl peroxydicarbonate, tert-butyl peroxyisopropyl carbonate or tert-butyl peroxy-2-ethylhexyl carbonate. Examples of readily oil-soluble azo initiators used include 2,2'-azobis(isobutyronitrile), 2,2'-azobis(2,4-dimethyl-valeronitrile) or 4,4'-azobis(4-cyanopentanoic acid).

A preferred oil-soluble free-radical initiator is a compound selected from the group comprising tert-butyl peroxy-2-ethylhexanoate (Trigonox® 21; Trigonox® brand name of Akzo Nobel), tert-amyl peroxy-2-ethylhexanoate (Trigonox® 121), tert-butyl peroxybenzoate (Trigonox® C), tert-amyl peroxybenzoate, tert-butyl peroxyacetate (Trigonox® F), tert-butyl peroxy-3,5,5-trimethylhexanoate (Trigonox® 42 S), tert-butyl peroxyisobutanoate, tert-butyl peroxydiethylacetate (Trigonox® 27), tert-butyl peroxypivalate (Trigonox® 25), tert-butyl peroxyisopropyl carbonate (Trigonox® BPIC), 2,5-dimethyl-2,5-di(tert-butylperoxy)hexane (Trigonox® 101), di-tert-butyl peroxide (Trigonox® B), cumyl hydroperoxide (Trigonox® K) and tert-butyl peroxy-2-ethylhexyl carbonate (Trigonox® 117). It will be appreciated that it is also possible to use mixtures of aforementioned oil-soluble free-radical initiators.

The amount of free-radical initiator used in preparing the polymer A used in accordance with the invention is generally 0.01% to 10%, preferably 0.1% to 8%, and with more particular preference 1% to 6% by weight, based in each case on the total monomer amount.

In preparing the polymer A used in accordance with the invention it is optionally possible to include a portion or the entirety of free-radical initiator in the initial charge to the polymerization vessel. It is also possible, however, to meter in the entirety or the optional remainder of free-radical initiator during the polymerization reaction. The entirety or the remainder of free-radical initiator may in that case be optionally metered into the polymerization vessel discontinuously, in one or more portions, or continuously, with constant or changing volume flows. With more particular advantage the free-radical initiator is metered during the polymerization reaction continuously, with constant volume flow—more particularly in the form of a solution of the free-radical initiator with the solvent used.

Polymer A for the inventive use advantageously has a weight-average molecular weight ≧1000 g/mol and ≦100 000 g/mol. It is advantageous if the weight-average molecular weight of polymer A is ≦50 000 g/mol or ≦40 000 g/mol. With more particular advantage polymer A has a weight-average molecular weight ≧3000 g/mol and ≦40 000 g/mol. With particular advantage the weight-average molecular weight is situated in the range ≧3000 and ≦25 000 g/mol. The setting of the weight-average molecular weight during the preparation of polymer A is familiar to the skilled worker and is advantageously accomplished by free-radically initiated aqueous solution polymerization in the presence of free-radical chain-transfer compounds, referred to as free-radical chain regulators. The determination of the weight-average molecular weight is also familiar to the skilled worker and is accomplished, for example, by means of gel permeation chromatography.

Examples of suitable free-radical chain regulators are organic compounds comprising sulfur in bonded form. They include, for example, mercapto compounds, such as mercaptoethanol, mercaptopropanol, mercaptobutanol, mercaptoacetic acid, mercaptopropionic acid, butyl mercaptan, and dodecyl mercaptan. Further free-radical chain regulators are familiar to the skilled worker. If the polymerization is carried out in the presence of free-radical chain regulators, it is common to use 0.01% to 10% by weight, based on the total monomer amount.

In the case of the preparation of polymer A used in accordance with the invention it is possible to include at least a portion of the free-radical chain regulator in the initial charge to the polymerization medium and to add the optional remainder to the polymerization medium after the free-radical polymerization reaction has been initiated, that addition taking place discontinuously in one portion, discontinuously in two or more portions, and also continuously with constant or changing volume flows. Frequently the total amount of the free-radical chain regulator is added continuously, together with the monomers A1 to A4, during the polymerization reaction.

By controlled variation of the nature and amount of the monomers A1 to A4 it is possible in accordance with the invention for the skilled worker to prepare polymers A which have a glass transition temperature or a melting point in the range from −60 to 270° C. Advantageously in accordance with the invention the glass transition temperature of the polymer A is ≧−20° C. and ≦110° C., and preferably ≧20° C. and ≦105° C.

The glass transition temperature, $T_g$, is the limiting value of the glass transition temperature to which said temperature tends with increasing molecular weight, according to G. Kanig (Kolloid-Zeitschrift & Zeitschrift für Polymere, vol. 190, p. 1, equation 1). The glass transition temperature or melting point is determined by the DSC method (differential scanning calorimetry, 20 K/min, midpoint measurement, DIN 53765).

According to Fox (T. G. Fox, Bull. Am. Phys. Soc. 1956 [Ser. II] 1, page 123, and in accordance with Ullmann's Encyclopädie der technischen Chemie, vol. 19, page 18, 4th edition, Verlag Chemie, Weinheim, 1980) the glass transition temperature of copolymers with no more than low degrees of crosslinking is given in good approximation by:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the polymers synthesized in each case only from one of the monomers 1, 2, ... n, in degrees Kelvin. The $T_g$ values for the homopolymers of the majority of monomers are known and are listed, for example, in Ullmann's Encyclopedia of Industrial Chemistry, 5th edition, vol. A21, page 169, VCH Weinheim, 1992; further sources of homopolymer glass transition temperatures include, for example, J. Brandrup, E. H. Immergut, Polymer Handbook, 1st ed., J. Wiley, New York 1966, 2nd ed. J. Wiley, New York 1975, and 3rd ed. J. Wiley, New York 1989).

The polymer A solutions obtained typically have polymer solids contents of ≧10% and ≦70%, frequently ≧20% and ≦65%, and often ≧40% and ≦60% by weight, based in each case on the corresponding polymer A solution.

Depending on the free-radical initiator used, the free-radically initiated polymerization takes place typically at temperatures in the range from 40 to 180° C., preferably from 50 to 150° C., and more particularly from 60 to 110° C. As soon as the temperature during the polymerization reaction is above the boiling point of the solvent and/or of one of the monomers A1 to A4, the polymerization is carried out advantageously under pressure (>1 atm absolute). The temperature and pressure conditions are familiar to the skilled worker or can be determined by him or her in a few routine experiments.

The polymers A can be prepared in the typical polymerization devices. Examples of those used for this purpose include glass flasks (laboratory) or stirred tanks (industrial scale) equipped with an anchor, blade, impeller, cross-arm, MIG or multistage pulsed counter-current stirrer. In the case more particularly of polymerization in the presence of only small amounts of solvent, it may also be advantageous to carry out the polymerization in typical one-screw of two-screw (co-rotating or counter-rotating) kneader reactors, such as those, for example, from the company List or Buss SMS.

Where polymer A is prepared in an organic solvent, at least some of the organic solvent, advantageously ≦50% or ≦90% by weight, and, with more particular advantage, all of the organic solvent, is generally removed, and the polymer A is taken up in water, advantageously in deionized water. The corresponding methods are familiar to the skilled worker. Thus, for example, the switching of the solvent for water can be accomplished by distilling off at least some of the solvent, advantageously all of it, in one or more stages, at, for example, atmospheric pressure or subatmospheric pressure (<1 atm absolute), and replacing it by water. Frequently it may be advantageous to remove the solvent from the solution by introducing steam and at the same time to replace it by water. This is more particularly the case when the organic solvent has a certain steam volatility.

In accordance with the invention the polymers A can be used in the form of polymer powders or of solutions of the polymers A in an aqueous medium or in organic solvents. Use is made with advantage of polymer powders or of solutions of the polymers A in an aqueous medium. More particularly, polymers A are used in the aqueous medium in which the polymerization of the polymers A was carried out, or that obtained following replacement of the organic solvent by water.

The free-radically initiated aqueous emulsion or suspension polymerization reactions making inventive use of the polymers A are typically accomplished by dispersing the ethylenically unsaturated monomers in the aqueous medium in the form of monomer droplets and subjecting them to polymerization using a free-radical initiator. In this context the free-radically initiated aqueous emulsion polymerization differs from the free-radically initiated aqueous suspension polymerization substantially in the use of a so-called water soluble free-radical initiator (in the case of emulsion polymerization) or of a so-called oil-soluble free-radical initiator (in the case of suspension polymerization). In this context it is possible in accordance with the invention to use all of the ethylenically unsaturated monomers (corresponding to the monomers A1 to A4, more particularly mixtures of monomers A4 and, in small amounts, monomers A2 and/or A3) that are customary in emulsion polymerization or suspension polymerization. The emulsion or suspension polymerizations of the invention can be carried out in accordance with the typical regimes, such as those known as the batch regime or feed regime, for example. It will be appreciated that it is also possible, in the case of the feed regime, to change the composition of the ethylenically unsaturated monomers fed in and thus, to obtain aqueous dispersions of polymers which are composed of two or more polymer phases (polymer compositions) or of a polymer composition which changes with a gradient. It is important that the invention is also intended to embrace the use of the polymers A as dispersing assistants in what is known as miniemulsion polymerization (monomers are dispersed using hydrophobic auxiliaries in the aqueous medium in the form of monomer droplets having an average diameter of ≦1000 nm and polymerized by means of an oil-soluble or water-soluble free-radical initiator) as a specific embodiment of emulsion and suspension polymerization.

Advantageous features of the polymers A used in accordance with the invention include the fact that they have very good solubility in water even without neutralization and so can be used directly, without neutralization, for dispersing in the case of the aqueous emulsion or suspension polymerizations. With particular advantage ≦50%, more particularly ≦20% of the carboxyl groups of the polymer A in the context of the inventive use have been neutralized by means of a base, and so the polymerization reactions can be carried out at pH levels in the range ≦7, more particularly ≧1 and ≦6 and advantageously ≧1 and ≦4. The pH here is determined at 23° C. by means of a calibrated pH meter of standard commercial type. The base used may be any of the basic compounds familiar to the skilled worker, such as, more particularly alkali metal and alkaline earth metal hydroxides, carbonates or hydrogen carbonates, such as sodium hydroxide, potassium hydroxide, calcium hydroxide, sodium hydrogen carbonate, potassium hydrogen carbonate, sodium carbonate, potassium carbonate, for example, or else ammonia, and also primary, secondary or tertiary amines, such as ethylamine, diethanolamine or triethanolamine, for example. It will be appreciated that it is in principle also possible to carry out the polymerization reactions even at pH levels in the range ≧7. Furthermore, of course, it is also possible for the aqueous polymer systems obtained after the emulsion or suspension polymerization to be adjusted by means of a base to a pH level ≧7, without this having deleterious consequences for the aqueous polymer systems.

The invention uses 0.1% to 150%, advantageously 10% to 130%, and with more particular advantage 20% to 110% by weight of polymer A (calculated as solids), based on the total monomer amount used in the free-radically initiated aqueous emulsion polymerization or suspension polymerization.

In accordance with the invention it is possible, in addition to the polymers A, for there to be other dispersing assistants used as well, such as emulsifiers and/or other protective colloids, subject to the proviso that they are compatible with the polymers A, something which in case of doubt can be checked by means of a few preliminary tests. A comprehensive description of further suitable protective colloids is found in Houben-Weyl, Methoden der organischen Chemie, Volume XIV/1, Makromolekulare Stoffe, Georg-Thieme-Verlag, Stuttgart, 1961, pages 411 to 420. An overview of suitable emulsifiers is found in Houben-Weyl, Methoden der organischen Chemie, Volume XIV/1, Makromolekulare Stoffe, Georg-Thieme-Verlag, Stuttgart, 1961, pages 192 bis 208.

The amount of emulsifiers and/or other protective colloids used optionally alongside of the polymers A in the emulsion or suspension polymerization is 0.1% to 5%, frequently 0.5 to 3%, and often 1% to 2% by weight, based in each case on the total monomer amount used in the free-radically initiated aqueous emulsion polymerization or suspension polymerization. With particular advantage, however, no further dispersing assistants other than the polymers A are used.

In accordance with the invention, it is possible to introduce the entirety of the polymer A in the initial charge in the aqueous polymerization medium before the free-radically initiated aqueous emulsion or suspension polymerization reaction has been initiated. An alternative option is to include, optionally, only a portion of the polymer A in the initial charge in the aqueous polymerization medium before the polymerization reaction has been initiated, and then, under polymerization conditions during the free-radical emulsion or suspension polymerization of the invention, to add any remaining amount discontinuously, in one or more portions, or continuously with constant or changing volume flow rates, in particular together and in parallel to the ethylenically unsaturated monomers that are to be polymerized. With particular advantage a portion of the polymer A in the aqueous polymerization medium is included in the initial charge in the aqueous polymerization medium before the polymerization reaction has been initiated, and the remainder of the polymer A is added in parallel to the ethylenically unsaturated monomers to be polymerized, after the polymerization has been initiated.

By initiation of the polymerization reaction is meant the start of the polymerization reaction of the monomers present in the aqueous polymerization medium, after the formation of free radicals from the free-radical initiator. This initiation of the polymerization reaction may take place by addition of free-radical initiator to the aqueous polymerization medium in the polymerization vessel under polymerization conditions. An alternative option is to include a portion or the entirety of the initiator, alone or together with a portion of the ethylenically unsaturated monomers, in the aqueous polymerization medium in the polymerization vessel under conditions which are not suitable for initiating a polymerization reaction, such as at low temperature, for example, and thereafter to set polymerization conditions in the aqueous polymerization medium. By polymerization conditions are meant, in general, those temperatures and pressures under which the free-radically initiated aqueous emulsion or suspension polymerization proceeds with a sufficient polymerization rate. They are dependent in particular on the free-radical initiator used. Advantageously the nature and amount of the free-radical initiator, the polymerization temperature, and the polymerization pressure are selected such that there are always sufficient initiating radicals available to initiate and maintain the polymerization reaction.

Suitable reaction temperatures for the free-radical aqueous emulsion or suspension polymerization of the invention span the entire range from 0 to 170° C. It is usual here to use temperatures of 50 to 120° C., frequently 60 to 110° C. and often 70 to 100° C. The free-radical aqueous emulsion or suspension polymerization of the invention can be carried out under a pressure less than, equal to or greater than atmospheric pressure, and consequently the polymerization temperature may exceed 100° C. and may be up to 170° C. Volatile monomers, such as ethylene, butadiene or vinyl chloride, for example, are polymerized preferably at an elevated pressure. In that case the pressure may adopt values of 1.2, 1.5, 2, 5, 10, or 15 bar (absolute) or even higher. Where the polymerization reactions are carried out under subatmospheric pressure, pressures of 950 mbar, frequently of 900 mbar and often of 850 mbar (absolute) are set. Advantageously the free-radical aqueous emulsion or suspension polymerization of the invention is carried out under atmospheric pressure with exclusion of oxygen, under an inert gas atmosphere, for example such as under nitrogen or under argon, for example.

As a result of the inventive use of the polymers A as dispersing assistants in free-radically initiated aqueous emulsion polymerization or suspension polymerization, they can be used directly without neutralization, which is why polymerization reactions in the strongly acidic range are also possible. Furthermore, when polymers A are used as dispersing assistants, in comparison to dispersing assistants which as well as monomers A2, or monomers A2 and A3, comprise no monomers A1 in copolymerized form, lower levels of coagulum are obtained in the free-radically initiated aqueous emulsion or suspension polymerization. Furthermore the aqueous polymer dispersions obtained using the polymers A generally have significantly lower viscosities.

The invention is elucidated with reference to the following nonlimiting examples.

EXAMPLES

A. Preparation of the Polymer A
Polymer A1

A 2 l four-necked flask equipped with an anchor stirrer, reflux condenser, and three metering devices was charged at 20 to 25° C. (room temperature) with 200 g of methyl ethyl ketone (MEK) and 51.3 g of maleic anhydride (MAn) under a nitrogen atmosphere. Subsequently the initial-charge solution was heated to 82° C. with stirring, and, beginning simultaneously, feed stream 1 was metered in over the course of 3 hours, feed stream 2 over the course of 5 hours, and feed stream 3 over the course of 5.5 hours, continuously and with constant volume flows. Thereafter the reaction mixture was polymerized at the aforementioned temperature for 2 more hours, after which the polymer solution obtained was cooled to room temperature.

| Feed stream 1: | |
|---|---|
| 120 g | MAn (in melted form) |
| Feed stream 2: | |
| 376 g | acrylic acid (AA) |
| 96.5 g | 1-octene, and |
| 217 g | MEK |
| Feed stream 3: | |
| 42.9 g | a 75% strength by weight solution of tert-butyl perpivalate in an aromatic-free hydrocarbon mixture and |
| 184 g | MEK |

Subsequently 1200 g of the organic polymer solution obtained were diluted with 700 g of deionized water, and water/MEK was distilled off on a rotary evaporator at a bath temperature of 80° C. until an internal pressure of 20 mbar (absolute) had been reached. Thereafter a solids content of 42.6% by weight was set by addition of deionized water. The K value of the polymer A was found to be 15.0, and the weight-average molecular weight was found to be 11 700 g/mol.

The solids content was generally determined by drying a sample of approximately 1 g in a forced-air drying oven at 120° C. for two hours. Two separate measurements were carried out in each case. The figures reported in examples A and B are averages of the two results.

The K value of the polymer A was determined by the method of Fikentscher (ISO 1628-1) by means of a 1% strength by weight polymer solution.

The weight-average molecular weight of the polymer A was determined by means of gel permeation chromatography (linear column: Supremea M from PSS, eluent: 0.08 mol/l TRIS buffer pH 7.0, deionized water, liquid flow: 0.8 ml/min, detector: differential refractometer ERC 7510 from ERC).

Comparative Polymer CA

Comparative polymer CA was prepared in the same way as for polymer A1, with the difference that feed stream 2 contained no 1-octene, but instead used 472.5 g of AA.

The K value of comparative polymer CA was found to be 16.5, and the weight-average molecular weight was found to be 12 500 g/mol.

B. Preparation of an Aqueous Polymer Dispersion
Polymer Dispersion B1

A 5-l reactor with anchor stirrer, heating and cooling devices, and various metering devices was charged at room temperature with the initial charge under a nitrogen atmosphere and this initial charge was heated to 90° C. with stirring and then maintained at that temperature. Thereafter 0.6 g of feed stream 2 was metered into the aqueous polymerization medium over the course of one minute and the resulting mixture was stirred for 5 minutes. After that the entireties of feed streams 1 and 3 and also the remainder of feed stream 2 were metered in, beginning simultaneously, over the course of 3 hours, at constant volume flow rates, to the aqueous reaction medium. Subsequently, feed stream 4 was metered in over the course of 30 minutes with a constant volume flow rate, followed by polymerization at 90° C. for 30 minutes. Thereafter the temperature was lowered to 70° C. and, beginning simultaneously, feed streams 5 and 6 were metered in over a period of 60 minutes at constant volume flow rates. After that the aqueous polymer dispersion obtained was cooled to room temperature and filtered through a 125 μm filter.

| Initial charge: | |
|---|---|
| 152 g | deionized water |
| 7.0 g | of the 42.6% strength by weight aqueous solution of polymer A1 |
| Feed stream 1: | |
| 700 g | of the 42.6% strength by weight aqueous solution of polymer A1 |
| Feed stream 2: | |
| 12.0 g | deionized water |
| 0.9 g | sodium persulfate |
| Feed stream 3: | |
| 135 g | n-butyl acrylate |
| 150 g | styrene |
| 15.0 g | 2-hydroxyethyl acrylate |
| Feed stream 4: | |
| 8.0 g | deionized water |

-continued

| | |
|---|---|
| 0.6 g | sodium persulfate |

Feed stream 5:

| | |
|---|---|
| 9.0 g | a 10% strength by weight aqueous solution of tert-butyl hydroperoxide |

Feed stream 6:

| | |
|---|---|
| 8.8 g | a 13.3% strength by weight aqueous solution of a 1:1 reaction product of acetone and sodium hydrogen sulfite |

The resulting aqueous polymer dispersion B1 had a pH of 1.6. The solids content was found to be 49.6% by weight, the viscosity 1098 mPas, the average particle size 246 nm and the coagulum content 0.01% by weight.

The pH was determined generally by means of a Schott Handylab 1 pH meter at 23° C.

The viscosity of the aqueous polymer dispersions was determined generally in accordance with DIN 53019 using a Physika Rheomat at 23° C. and a shear rate of 250 s$^{-1}$.

The average particle size was determined generally by the method of quasielastic light scattering (DIN-ISO 13321) using a High Performance Particle Sizer (HPPS) from Malvern Instruments Ltd.

The coagulum content was generally determined by rinsing the 125 μm filter with 100 ml of deionized water after filtration and drying the resulting material in a drying cabinet at 140° C. for 30 minutes. Each of the values reported relates to the solids content of the polymer dispersion in question.

Comparative Polymer Dispersion CB1

The preparation of aqueous comparative polymer dispersion CB1 took place in exactly the same way as for the preparation of aqueous polymer dispersion B1, with the difference that the 42.6% strength by weight aqueous solution of polymer A1 was replaced entirely by the 42.6% strength by weight aqueous solution of comparative polymer CA.

The aqueous comparative polymer dispersion CB1 obtained had a pH of 1.7. The solids content was found to be 49% by weight, the viscosity 1254 mPas, the average particle size 291 nm and the coagulum content 0.6% by weight.

Polymer Dispersion B2

The aqueous polymer dispersion B2 was prepared in exactly the same way as the aqueous polymer dispersion B1, with the difference that the following monomer mixture was used as feed stream 3:

| Feed stream 3: | |
|---|---|
| 129 g | n-butyl acrylate |
| 141 g | styrene |
| 15.0 g | 2-hydroxyethyl acrylate |
| 15.0 g | glycidyl methacrylate |

The aqueous polymer dispersion B2 obtained had a pH of 1.6. The solids content was found to be 49.8% by weight, the viscosity 1970 mPas, the average particle size 249 nm and the coagulum content 0.03% by weight.

Comparative Polymer Dispersion CB2

The preparation of aqueous comparative polymer dispersion CB2 took place in exactly the same way as for the preparation of aqueous polymer dispersion B2, with the difference that the 42.6% strength by weight aqueous solution of polymer A1 was replaced entirely by the 42.6% strength by weight aqueous solution of comparative polymer CA.

The aqueous comparative polymer dispersion CB2 obtained had a pH of 1.6. The solids content was found to be 48.4% by weight, the viscosity 2320 mPas, the average particle size 309 nm and the coagulum content 0.7% by weight.

The invention claimed is:

1. A method comprising conducting free-radically initiated aqueous emulsion polymerization or suspension polymerization in the presence of a dispersing assistant, wherein the dispersing assistant is an addition polymer A comprising in copolymerized form:
   0.1% to 40% by weight of at least one C3 to C30 alkene (monomer A1),
   40% to 99.9% by weight of at least one ethylenically unsaturated C3 to C6 monocarboxylic acid (monomer A2),
   0% to 50% by weight of at least one ethylenically unsaturated C4 to C12 dicarboxylic acid and/or of the ethylenically unsaturated dicarboxylic monoalkyl esters or dicarboxylic anhydrides obtainable from said acid (monomer A3), and
   0% to 30% by weight of at least one other ethylenically unsaturated compound which is copolymerizable with the monomers A1 to A3 (monomer A4),
   the amounts of monomers A1 to A4 adding up to 100% by weight.

2. The method according to claim 1, wherein 0.1% to 150% by weight of polymer A is present based on the total monomer amount used in the free-radically initiated aqueous emulsion polymerization or suspension polymerization.

3. The method according to claim 1, wherein polymer A comprises
   1% to 25% by weight of monomers A1,
   50% to 89% by weight of monomers A2, and
   10% to 40% by weight of monomers A3.

4. The method according to claim 1, wherein monomers A1 are at least one selected from the group consisting of 1-alkenes having 6 to 18 carbon atoms.

5. The method according to claim 1, wherein monomers A2 are at least one selected from the group consisting of acrylic acid, methacrylic acid, ethylacrylic acid, allylacetic acid, crotonic acid and vinylacetic acid.

6. The method according to claim 1, wherein monomers A3 are present and are at least one selected from the group consisting of maleic anhydride, methylmaleic anhydride, maleic acid, methylmaleic acid, monomethyl maleate, itaconic acid, itaconic anhydride, 1,2,3,6-tetrahydrophthalic acid and 1,2,3,6 tetrahydrophthalic anhydride.

7. The method according to claim 1, wherein polymer A has a weight-average molecular weight ≧3000 g/mol and ≦40,000 g/mol.

8. The method according to claim 1, wherein ≦50% of the carboxyl groups of the polymer A have been neutralized using a base.

9. The method according to claim 1, wherein polymer A comprises
   5% to 20% by weight of monomers A1,
   55% to 75% by weight of monomers A2, and
   20% to 35% by weight of monomers A3.

10. The method according to claim 1, wherein monomers A1 comprise at least one of oct-1-ene and dodec-1-ene.

11. The method according to claim 1, wherein monomers A2 comprise acrylic acid.

12. The method according to claim 1, wherein monomers A3 are present and comprise maleic anhydride.

13. The method according to claim 1, wherein monomers A4, if present, do not include crosslinking monomers.

14. The method according to claim 1, wherein polymer A has a weight-average molecular weight $\geq 3000$ g/mol and $\leq 25{,}000$ g/mol.

15. The method according to claim 1, wherein polymer A has a glass transition temperature of $\geq -20°$ C. and $\leq 110°$ C.

16. The method according to claim 1, wherein polymer A has a glass transition temperature of $\geq 20°$ C. and $\leq 105°$ C.

17. The method according to claim 1, wherein 10% to 130% by weight of polymer A is present based on the total monomer amount used in the free-radically initiated aqueous emulsion polymerization or suspension polymerization.

18. The method according to claim 1, wherein 20% to 110% by weight of polymer A is present based on the total monomer amount used in the free-radically initiated aqueous emulsion polymerization or suspension polymerization.

* * * * *